United States Patent [19]

Hamada et al.

[11] Patent Number: 5,061,572

[45] Date of Patent: Oct. 29, 1991

[54] THERMOPLASTIC ELASTOMER LAMINATE

[75] Inventors: Shunichi Hamada; Akira Uchiyama, both of Ichihara; Katsuo Okamoto, Funabashi, all of Japan

[73] Assignee: Mitsui Petrochemical Industries, Ltd., Tokyo, Japan

[21] Appl. No.: 412,625

[22] Filed: Sep. 26, 1989

Related U.S. Application Data

[63] Continuation of Ser. No. 178,910, Apr. 7, 1988, abandoned.

[30] Foreign Application Priority Data

Apr. 7, 1987 [JP] Japan .................. 62-85541

[51] Int. Cl.$^5$ ................................ C09J 7/02
[52] U.S. Cl. ................... 428/516; 428/246; 428/284; 428/286; 428/904
[58] Field of Search ............. 428/246, 284, 286, 904, 428/516

[56] References Cited

U.S. PATENT DOCUMENTS

| | | | |
|---|---|---|---|
| 3,922,402 | 11/1975 | Shimamura et al. | 428/904 |
| 4,018,954 | 4/1977 | Fukushima et al. | 428/904 |
| 4,356,226 | 10/1982 | Georlette et al. | 428/904 |
| 4,356,226 | 10/1982 | Geodette et al. | 428/904 |
| 4,377,010 | 3/1983 | Fydelor et al. | 428/516 |
| 4,569,712 | 2/1986 | Shibano et al. | 428/904 |
| 4,868,052 | 9/1989 | Guerdoux et al. | 428/516 |
| 5,001,015 | 3/1991 | Havens | 428/516 |

FOREIGN PATENT DOCUMENTS

| | | | |
|---|---|---|---|
| 54-160481 | 12/1979 | Japan | 428/516 |
| 61-233076 | 10/1986 | Japan | 428/516 |
| 64-090747 | 4/1989 | Japan | 428/516 |

OTHER PUBLICATIONS

Chemical Abstracts 84:166016u, "Adhering Natural or Synthetic Textile Fibers to Olefin Copolymers", (vol. 84, 1976); an abstract of Italian Patent 770042 (1967).

*Primary Examiner*—George F. Lesmes
*Assistant Examiner*—Beverly A. Pawlikowski
*Attorney, Agent, or Firm*—Sherman & Shalloway

[57] ABSTRACT

A thermoplastic elastomer laminate comprising: a base fabric, a polyolefin intermediate layer formed on said fabric comprising a polyolefin, at least a part of which is modified by grafting with at least one monomer selected from unsaturated carboxylic acids and derivatives thereof, and a thermoplastic elastomer surface layer formed on said intermediate layer comprising a thermoplastic elastomer. The surface layer is comprised of a composition comprising: a polyolefin resin and an ethylene/alpha-olefin copolymer rubber, in which only said copolymer rubber is, or both said copolymer rubber and at least a part of said polyolefin resin are partially crosslinked. The product is attractive as an artificial leather.

3 Claims, No Drawings

THERMOPLASTIC ELASTOMER LAMINATE

This application is a continuation of application Ser. No. 07/178,910 filed Apr. 7, 1988, now abandoned.

FIELD OF THE INVENTION

This invention relates to a thermoplastic elastomer laminate having leather-like appearance useful as interior automotive sheets, covers of furniture and the like.

BACKGROUND OF THE INVENTION

Synthetic resin leathers, in particular vinyl chloride resin leathers comprising a surface sheet of a non-rigid polyvinyl chloride or a polyblend of a non-rigid polyvinyl chloride and an ABS resin, backed with a base fabric, have heretofore been employed as interior automotive sheets and covers (surface skins) of chairs, sofas and other furniture.

However, various problems are associated with the vinyl chloride resin leathers. They are liable to be deteriorated and discolored by the action of ultraviolet rays in sunlight, and are not well resistant against hot atmospheric temperatures in that they provide a uncomfortable sticky touch, when hot. They are also not well resistant against cold atmospheric temperatures in that they often undergo brittle fracture leading to crackings, when very cold as in cold districts. Further, the non-rigid polyvinyl chloride used in the vinyl chloride leathers contains a large amount of a plasticizer, normally on the order of from about 25 to about 50% by weight. Bleeding-out of the plasticizer may often stain things brought in contact with the product, and may impair insulation when the product is used in electric instruments.

Under the circumstances, it is desired in the art to develop a synthetic resin leather which is not deteriorated or discolored upon exposure to sunlight, which is well resistant against hot and cold atmospheric temperatures and which does not suffer from problems that may be raised by the use of a large amount of a plasticizer.

OBJECT OF THE INVENTION

The invention is to solve the above-mentioned problems involved in the prior art, and an object of the invention is to provide a synthetic resin leather which is not deteriorated or discolored upon exposure to sunlight, which is well resistant against hot and cold atmospheric temperatures and which does not contain a large amount of a plasticizer, and, in consequence, does not suffer from problems that may be raised by the use of a large amount of a plasticizer.

SUMMARY OF THE INVENTION

A synthetic resin leather according to the invention is a thermoplastic elastomer laminate which comprises:
(a) a base fabric,
(b) a polyolefin intermediate layer formed on said fabric comprising a polyolefin, at least a part of which is modified by grafting with at least one monomer selected from unsaturated carboxylic acids and derivatives thereof, and
(c) a thermoplastic elastomer surface layer formed on said intermediate layer comprising a thermoplastic elastomer.

In particular, the thermoplastic elastomer surface layer is comprised of a composition comprising:

(A) a polyolefin resin, and
(B) an ethylene/alpha-olefin copolymer rubber, in which only said copolymer rubber is, or both said copolymer rubber and at least a part of said polyolefin resin are partially crosslinked.

The thermoplastic elastomer laminate according to the invention may further comprises a painted film layer on said surface layer made from a reactive paint containing at least one compound selected from saturated polyester resins, acrylate resins and isocyanate resins. The thermoplastic elastomer laminate according to the invention may further comprises a primer layer formed on said surface layer comprising at least one polymeric compound selected from saturated polyesters and chlorinated polyolefins, and a topcoat layer formed on said primer layer made from a reactive paint containing at least one compound selected from saturated polyester resins, acrylate resins and isocyanate resins, with a proviso that when said primer layer consists essentially of at least one polymeric compound selected from saturated polyester resins, said topcoat layer is made from a reactive paint containing at least one compound selected from acrylated resins.

The thermoplastic elastomer laminate according to the invention in which the base fabric (a) and the thermoplastic elastomer surface layer (c) are firmly bonded together by means of the specified polyolefin intermediate layer (b), has excellent properties in that it is not deteriorated or discolored upon exposure to sunlight; it is well resistant against hot and cold atmospheric temperatures; and it does not contain a large amount of a plasticizer, and, in consequence, does not suffer from problems that may be raised by the use of a large amount of a plasticizer.

DETAILED DESCRIPTION OF THE INVENTION

The base fabric (a), polyolefin intermediate layer (b) and thermoplastic elastomer layer (c), which constitute the thermoplastic elastomer laminate according to the invention, will now be described in detail.

BASE FABRIC

Base fabrics which can be used herein are not specially restricted. Any fabrics that have heretofore been used as a base fabric in known synthetic resin leathers can be used herein as a base fabric. Fibers employed in the base fabric may be natural fibers, such as cotton and linen; inorganic fibers, such as glass, carbon, asbestos and metallic fibers; reproduced fibers, such as viscose rayon and cupra; semi-synthetic fibers, such as di- and tri-acetate fibers; and/or synthetic fibers, such as nylon 6, nylon 66, polyester (e.g., polyethylene terephthalate), aromatic polyamide, acrylic, polyolefin and acetalized (e.g., formalized) polyvinyl alcohol fibers.

Fibers in the base fabric may be in any form including, for example, a spun staple fiber yarn, twisted filament yarn, split yarn and tape yarn. Further, the fabric may be woven or non-woven, or composite.

Among others, fabrics of rayon staple, wooly nylon and nylon are particularly prefered.

POLYOLEFIN INTERMEDIATE LAYER

The polyolefin intermediate layer (b) serves to firmly bond the thermoplastic elastomer surface layer (c) to the base fabric (a), and comprises a polyolefin, at least a part of which is modified by grafting with at least one monomer (which may be referred to herein as a graft monomer) selected from unsaturated carboxylic acids and derivatives thereof.

By the term "polyolefin" we mean amorphous, low crystaline and crystalline homopolymers and copolymers of olefinic monomers. Examples of the olefinic monomer include ethylene, propylene, 1-butene, 1-hexene, 3-methylpentene and 4-methyl-1-pentene. Examples of polyolefin include high, medium and low density polyethylenes, polypropylene, ethylene-propylene copolymer, ethylene-1-butene copolymer, ethylene-1-hexene copolymer and propylene-1-butene copolymer, alone or in combination. Of these, low density polyethylene, ethylene-propylene copolymer and ethylene-1-butene copolymer are particularly preferred.

At least a part of the polyolefin in the intermediate layer should be modified by grafting with at least one monomer selected from unsaturated carboxylic acids and derivatives thereof. Suitable graft monomers are ethylenically unsaturated dicarboxylic acids, such as maleic acid, fumaric acid, citraconic acid and itaconic acid. Derivatives of such acids, including anhydrides, esters, half esters, amides and imides may also be used for modifying the polyolefin. Examples of the suitable derivatives of ethylenically unsaturated dicarboxylic acids include maleic anhydride, itaconic anhydride, citraconic anhydride, monomethyl maleate, dimethyl maleate, monomethyl fumarate, dimethyl fumarate, maleic monoamide, maleic diamide, maleic N-monoethylamide, maleic N,N-diethylamide, maleic N-monobutylamide, maleic N,N-dibutylamide, fumaric monoamide, fumaric diamide, fumaric N-ehylamide, fumaric N,N-diethylamide, fumaric N-monobutylamide, fumaric N,N-dibutylamide, maleimide, N-butylmaleimide and N-phenylmaleimide. The polyolefin in the intermediate layer may also be modified with at least one graft monomer selected form unsaturated monocarboxylic acids and derivatives thereof. Examples of such graft monomers include acrylic and methacrylic acids, and methyl and ethyl acrylates and methacrylates. The most preferred graft monomers are maleic anhydride and fumaric acid.

When all of the polyolefin in the intermediate layer is modified with one or more carboxylating graft monomers, that is when the polymeric component in the intermediate layer consists essentially of a modified polyolefin, the modified polyolefin should contain graft polymerized portions derived from the graft monomer or monomers in an amount of from about $10^{-4}$ to about 4% by weight, preferably from about $10^{-3}$ to about 1% by weight, from view points of adhesion of the intermediate layer to the base fabric and surface layer as well as heat stability of the intermediate layer. We have found that the modification of the polyolefin with such a small amount of the carboxylating graft monomer greatly improves the adhesion of the intermediate layer to the base fabric and surface layer. The modified polyolefin, because of the slightest modification, retaines substantially the same heat-sealability, heat stability and shapability possessed by the corresponding unmodified polyolefin, and thus, can be handled in the same manner as with the unmodified polyolefin.

Grafting a graft monomer onto a polyolefin can be carried out in a known manner. For example, a mixture of the polyolefin and the graft monomer may be heated to a suitable elevated temperature with or without a solvent and in the presence or absence of a radical initiator. The reaction may be carried out in the coexistence of other vinyl monomers, such as styrene.

With a polyolefin control of the degree of modification can be carried out without any difficulties. Accordingly, upon preparation of the polyolefin intermediate layer, a polyolefin may be modified by grafting with a carboxylating graft monomer or monomers to provide a modified polyolefin having a desired degree of carboxylation, that is a modified polyolefin containing graft polymerized portions derived from the graft monomer or monomers in an amount of from about $10^{-4}$ to about 4% by weight, preferably from about $10^{-3}$ to about 1% by weight, and the so prepared modified polyolefin may be used in the preparation of the intermediate layer as a single polymeric component of the intermediate layer. Alternatively, a polyolefin may be modified by grafting with a carboxylating graft monomer or monomers to provide a modified polyolefin having a degree of carboxylation higher than the desired degree of carboxylation, and the so prepared modified polyolefin may be blended with an unmodified polyolefin to provide a polyolefin composition containing graft polymerized portions derived from the graft monomer or monomers in an amount of from about $10^{-4}$ to about 4% by weight, preferably from about $10^{-3}$ to about 1% by weight based on the combined weight of the modified and unmodified polyolefins. Such a composition comprising the modified and unmodified polyolefins can be used for preparing the intermediate layer. The latter approach is preferred.

The intermediate layer may further comprise an antiblocking agent, pigments and fillers in amounts not to impair desired properties of the layer.

THERMOPLASTIC ELASTOMER SURFACE LAYER

The thermoplastic elastomer surface layer comprises a thermoplastic elastomeric composition comprising:
(A) a polyolefin resin, and
(B) an ethylene/alpha-olefin copolymer rubber,
in which only said copolymer rubber is, or both said copolymer rubber and at least a part of said polyolefin resin are partially crosslinked. Representatives of such thermoplastic elastomeric compositions are preferably those comprising; 100–30 parts by weight of a partially cross-linked copolymer rubber composition (I) obtained by dynamically heat treating in the presence of a crosslinker a mixture comprising
(a) 100–20 parts by weight of an ethylene/α-olefin copolymer rubber,
(b) 0–80 parts by weight of a polyolefin resin (herein the amount of (a)+(b) is selected so as to become 100 parts by weight),
and if necessary 0–200 parts by weight (preferably 0–100 parts by weight) of at least one component selected from the group of
(c) peroxide non-crosslinking type hydrocarbon rubbery substances and
(d) mineral oil type softening agents, and
0–70 parts by weight of a polyolefin resin (II).

The above-mentioned thermoplastic elastomeric compositions used in the present invention may further be exemplified concretely with reference to the following compositions.

(1) A thermoplastic elastomer composition, i.e. a partially cross-linked copolymer rubber composition (I) obtained by dynamically heat treating in the presence of a crosslinker a mixture (I) comprising;

(a) 100–20, preferably 90–30, more preferably 90–60 parts by weight of an ethylene/α-olefin copolymer rubber, and (b) 0–80, preferably 10–70, more preferably 10–40 parts by weight of a polyolefin resin, or a mixture (II) comprising;

a blend of 100 parts by weight of the mixture (I) and 0–200, preferably 3–100 more preferably 5–100 parts by weight of (c) a peroxide non-crosslinking type hydrocarbon rubbery substance and/or (d) a mineral oil type softening agent.

(2) A thermoplastic elastomeric composition comprising 100 parts by weight of the above-mentioned thermoplastic elastomeric composition (I) and up to 700/3 parts by weight (about 233 parts by weight), of a polyolefin resin (II).

In the present invention, it is not preferable to use uncrosslinked elastomer compositions in place of the partially cross-linked thermoplastic elastomer compositions because the polymer compositions obtained thereby decrease in tensile characteristics, heat resistance or oil resistance.

The ethylene/α-olefin copolymer rubber (a) which is a starting material for the thermoplastic elastomer used in the present invention includes substantially amorphous copolymer rubbers comprising mainly ethylene and α-olefin of 3–14 carbon atoms, for example, ethylene/propylene copolymer rubber, ethylene/propylene/non-conjugated diene terpolymer or multi-component copolymer rubber, ethylene/butadiene copolymer rubber, ethylene-1-butene copolymer rubber, and ethylene/1-butene/non-conjugated diene multi-component copolymer rubber, or mixtures thereof. Of these copolymer rubbers, preferred are ethylene/propylene copolymer rubber and ethylene/propylene/non-conjugated diene terpolymer.

The non-conjugated diene referred to in the above-mentioned copolymer rubbers signifies dicyclopentadiene, 1,4-hexadiene, cyclooctadiene, methylenenorbornene, 5-ethylidene-2-norbornene, etc., and copolymers containing as a third component dicyclopentadiene or 5-ethylidene-2-norbornene are preferred.

These copolymers or multi-component polymers have Mooney viscosity [$ML_{1+4}$ (100° C.)] of 10–180, preferably 40–140, and an iodine value (unsaturation degree) of preferably less than 16.

As the amount of each constituent unit contained in these copolymer rubbers at the 1-olefin moiety, a proportion of ethylene unit/α-olefin unit is 50/50 to 92/8, preferably 70/30 to 85/15 (molar ratio), and a proportion of 1-olefin (ethylene+α-olefin) unit/non-conjugated diene unit is usually 100/0–90/10, preferably 98/2 to 90/10, more preferably 97/3 to 94/6.

The polyolefin resin (b) to be mixed with the ethylene/α-olefin copolymer rubber at the time of dynamic heat treatment includes resinous high molecular substances, for example, homopolymers of 1-olefin such as ethylene, propylene, butene-1, hexene-1, 4-methyl-1-pentene, etc., copolymers of these monomers, or copolymers of α-olefin and less than 15 mol % of other Co polymerizable monomers, for example, ethylene/vinyl acetate copolymers, ethylene/acrylic acid copolymer, ethylene/methyl acrylate copolymers, ethylene/ethyl acrylate copolymers, ethylene/methacrylic acid copolymers, ethylene/methyl methacrylate copolymers, etc. Of these polyolefin resins, preferably used are those having a melt index (ASTM-D-1238-c65T) of 0.1–50 g/10 min, particularly 5–20 g/10 min and a crystallinity index of 40% or higher as obtained by X-ray diffractometry.

Of the above-illustrated polyolefin resins (b), those which may be exemplified as the preferred polyolefin resin (b) are peroxide decomposition type polyolefin resins (polyolefin resins which decrease in molecular weight and increase in flowability of resin by thermal decomposition when mixed with a peroxide followed by kneading under application of heat) having a melt index of 0.1–50 g/10 min and a crystallinity index of 40% or higher. The peroxide decomposition type polyolefin resins exemplified above include isotactic polypropylene or copolymers of propylene and less than 15 mol % of other α-olefins, for example, propylene/ethylene copolymers, propylene/1-butene copolymers, propylene/1-hexene copolymers and propylene/4-methyl-1-pentene copolymers. Some peroxide crosslinking type polyolefin resins (polyolefin resins which decrease in flowability by crosslinking when mixed with a peroxide followed by kneading under application of heat), for example, low, medium and high density polyethylenes may also be used as the polyolefin resin (b).

As the polyolefin resin (b), preferably used is a mixture of the above-mentioned peroxide decomposition type polyolefin resin and a peroxide crosslinking type polyolefin resin (Such as a low, medium or high density polyethylene having a density of 0.910 to 0.940, in a proportion by weight of 100/0 to 30/70, particularly 40/20 to 20/40, because of excellent film forming properties of the mixture. The thermoplastic elastomer compositions comprising a mixture of (a) 30–50 parts by weight of an ethylene/α-olefin copolymer, (b) 20–40 parts by weight of a polypropylene resin and 20–40 parts by weight of a polyethylene resin and, if necessary, (c) a peroxide non-crosslinking type hydrocarbon rubbery substance and/or (d) a mineral oil, said mixture has been dynamically crosslinked, are particularly preferred since the sheet-like articles obtained therefrom are excellent in physical properties.

The peroxide non-crosslinking type hydrocarbon rubbery substance (c) which is an optional component used at the time of preparation of the thermoplastic elastomer signifies a hydrocarbon type rubbery substance which does not crosslink even when mixed with a peroxide and kneaded under application of heat and does not decrease in flowability, for example, polyisobutylene rubber, butyl rubber, propylene/ethylene copolymer rubber containing at least 70 mol % of propylene, propylene/1-butene copolymer rubber or atactic polypropylene. Among these, most preferred are polyisobutylene rubber, butyl rubber and propylene/1-butene copolymer rubber.

The mineral oil type softening agent (d) is a high boiling petroleum fraction which is used for weakening intramolecular action force of rubber when rubber is usually roll processed, thereby facilitating the processing of rubber and, at the same time, for promoting dispersion of carbon black or white carbon in the rubber, or for reducing hardness of vulcanized rubber to increasing flexibility or elasticity, and the high boiling petroleum fractions of paraffin, naphthene or aromatic type are used.

In preparing the thermoplastic elastomers, incorporation of such peroxide non-crosslinking type hydrocarbon rubbery substance (c) and/or mineral oil type softening agent (d) is not always necessary. However, in order to further improve flow characteristics, i.e. mold processing characteristics, of polymer compositions, it is desirable to add up to 200, preferably 3-100 parts by weight of the above-mentioned (c) and/or (d) to 100 parts by weight of the sum of an ethylene/α-olefin copolymer rubber (a) and a polyolefin resin (b).

The polyolefin resin (II) which is added, if necessary, after the dynamic heat treatment in accordance with the present invention includes resins similar to the polyolefin resin (b) added at the time of the dynamic heat treatment, that is, said polyolefin resin (II) includes homopolymers of 1-olefin such as ethylene, propylene, butene-1, hexene-1, 4-methyl-1-pentene, etc., copolymers of two or more of these monomers, or copolymers of α-olefin and less than 15 mol % of other polymeric monomers, for example, ethylene/vinyl acetate copolymers, ethylene/acrylic acid copolymers, ethylene/methyl acrylate copolymers, ethylene/ethyl acrylate copolymers, ethylene/methacrylic acid copolymers, ethylene/methyl methacrylate copolymers, etc., and such resinous high molecular substances are used. These polyolefin resins (II) preferably have a melt index (ASTM-D-1238-65T, 190° C. but 230° C. in case of propylene polymers) of 5-100, particularly 10-50. Where the polyolefin resins are added at the time of the dynamic heat treatment and also after said heat treatment, the polyolefin resin (b) and polyolefin resin (II) may be the same or different.

To prepare a partially cross-linked product of the ethylene/α-olefin copolymer rubber, which is one component of the thermoplastic elastomer used in the present invention, it is sufficient that 100 parts by weight of a blend comprising a mixture of 100-20 parts by weight of an ethylene/α-olefin copolymer rubber, 0-80 parts by weight of a polyolefin resin (b) and, if necessary, 0-200 parts by weight of a peroxide non-crosslinking type rubber (c) and/or a mineral oil type softening agents (d), is mixed with about 0.01-3%, preferably 0.05-3% more preferably 0.1-0.5% by weight, based on the blend, of a crosslinker and dynamically heat treated to effect partial crosslinking.

By dynamic heat treatment as used herein is meant the fact that the kneading is effected in a molten state.

The kneading is preferably effected in a closed type apparatus and in an inert gas atmosphere such as nitrogen or carbon dioxide gas. The kneading temperature is usually 150°-280° C., preferably 170°-240° C., and the kneading time is usually 1-20 minutes, preferably 1-10 minutes.

Crosslinkers used for the intended partial crosslinking are organic peroxides, sulfur, phenol type vulcanizing agents, oximes, polyamine, etc. Of these crosslinkers, preferred are organic peroxides and phenol type vulcanizing agents from the standpoint of physical properties of the thermoplastic elastomers obtained.

Usable as the organic peroxides are dicumyl peroxide, di-tert-butylperoxide, 2,5-dimethyl-2,5-bis(tert-butylperoxy)hexane, 2,5-dimethyl-2,5-bis(tert-butylperoxy)hexine-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, dibenzoylperoxide, tert-butylperoxybenzoate, etc. Of these organic peroxides, preferred are bisperoxide type compounds in point of less odor and high scorch stability, and particularly optimal is 1,3-bis(tert-butylperoxyisopropyl)benzene.

At the time of effecting partial crosslinking heat treatment, crosslinking aids such as p-quinonedioxime and, p,p'-dibenzoylquinonedioxime and a polyfunctional vinyl monomer such as divinylbenzene (DVB) may be used. Particularly, the use of divinylbenzene (DVB) is most preferred since crosslinking effect obtained by the heat treatment is uniform, and the thermoplastic elastomers well balanced between flowability and physical properties are obtained thereby.

The thermoplastic elastomers may further be incorporated with fillers such as carbon black, clay, talc, calcium carbonate, calcium bicarbonate, kaolin, diatomaceous earth, silica, alumina, asbestos, graphite, glass fiber, etc. or antioxidants such as phenyl-α-naphthylamine, 2,6-ditertiary-butylphenol, tetrakis[methylene(3,5-di-tert-butyl-4-hydroxyphenyl)propionate], etc., weathering agents, flame retardants, antistatic agents and the like additives.

These fillers and additives may be added to the thermoplastic elastomers at the stage of preparation thereof or at the time of molding the prepared thermoplastic elastomers.

By partial crosslinking as used herein is meant that the composition after being crosslinked has been found to be crosslinked to such an extent that the crosslinked composition does not lose its properties as thermoplastic elastomer, and usually is meant a composition having a gel content of at least 40% as measured by the following procedure. Of the crosslinked compositions, preferred are those having the gel content of at least 45%, particularly 70-99.5%.

The measurement of gel content is conducted in the following manner. About 100 mg of sample pellets of thermoplastic elastomer is weighed, and the sample pellets are placed in a closed container and immersed at 23° C. for 48 hours in 30 cc of cyclohexane, and thereafter the sample pellets are taken out therefrom and dried for at least 72 hours until no change in in weight is observed. From the weight of this dried residue is deducted a total weight of all the additives such as insoluble filler, pigment and the like other than the polymer component to obtain a corrected final weight (Y). On one hand, from the weight of the sample pellets is deducted a total weight of cyclohexane-insoluble components other than the ethylene/α-olefin copolymer, for example, a mineral oil or plasticizer, cyclohexane-soluble rubber, and insoluble components other than the polyolefin resin, such as a filler, pigment and the like, to obtain a corrected initial weight (X).

The gel content is decided from those values according to the following equation.

$$\text{Gel content (\%)} = \frac{\text{Corrected final weight } (Y)}{\text{Corrected initial weight } (X)} \times 100$$

The thermoplastic elastomers having the compositions as mentioned above are fed to a plastic processing machine such as an extruder equipped with T-die, a calendering machine, etc., where it is shaped according to the usual method into a desired shape. At the time of shaping the thermoplastic elastomer, desired pattern (emboss) may be formed on the surface of the product.

The thermoplastic elastomer surface layer thus shaped has excellent physical properties, for example, weatherability, resistance, against hot and cold atmospheric temperatures and resistance to light.

The thermoplastic elastomer laminate according to the invention may be provided with a painted film layer on the thermoplastic elastomer surface layer, which painted film is made from a reactive paint containing at least one compound selected from saturated polyester resins, acrylate resins and isocyanate resins. Preferably, a primer layer comprising at least one polymeric compound selected from saturated polyesters and chlorinated polyolefins is formed on the thermoplastic elastomer surface layer, and a topcoat layer made from a reactive paint containing at least one compound selected from saturated polyester resins, acrylate resins and isocyanate resins is formed on the primer layer. By doing so, abrasion resistance and scrach resistance of the surface layer can be improved, and surface gloss and touch of the surface layer can be adjusted in optimum conditions.

To form the primer layer on the surface of the thermoplastic surface layer, it is sufficient that at least one compound selected from saturated polyesters and chlorinated polyolefins is dissolved in an organic solvent and the so prepared coating solution for forming the primer layer applied according to the usual method on the surface of the thermoplastic elastomer surface layer.

Saturated polyester resins used for forming the primer layer include polyethylene terephthalate, polybutylene terephthalate and derivatives thereof. Chlorinated polyolefin resins used for the same purpose include chlorinated polyethylene, chlorinated polypropylene, ethylene chloride/α-olefin copolymers.

The coating solution for forming the primer layer may be incorporated, if necessary, with silicic acid anhydride (silica), pigments, delustering agents, etc. in addition to the above-mentioned saturated polyester resin or chlorinated polyolefin.

In particular, the addition to the coating solution of silicic acid anhydride in an amount of up 100% by weight of the aforesaid polyester resin or chlorinated polyolefin is preferred.

The organic solvents used for dissolving the saturated polyester resin or chlorinated polyolefin resin include toluene, methyl ethyl ketone, ethyl acetate, methylene chloride, cyclohexanone, etc.

Of these solvents, particularly useful is a mixed solvent comprising toluene and methyl ethyl ketone. The solids concentration in the coating solution for forming the primer layer is 2-50% by weight, preferably about 10-15% by weight.

A film thickness of the primer layer formed on the surface of the thermoplastic elastomer surface layer is preferably about 10-20 μm.

When the primer layer mentioned above is formed on the thermoplastic elastomer surface layer, the primer forming coating solution may be applied by dividing it into a plurality of times and, in that case a plurality of primer forming coating solutions having different compositions but within the scope specified herein may be used.

On the surface of the primer layer formed in the above manner on the thermoplastic elastomer surface layer, a topcoat layer is formed from a reactive paint containing at least one compound selected from saturated polyesters, acryliate resins and polyisocyanate resins. Provided that when the primer layer contains only a saturated polyester out of the saturated polyesters and chlorinated polyolefins as specified above, the topcoat layer should be formed from a reactive paint containing at least an acrylic ester resin.

To form the topcoat layer on the primer layer, it is sufficient that at least one compound selected from the group of saturated polyesters, acrylic esters, and polyisocyanates is dissolved in an organic solvent, and the topcoat forming coating solution obtained is applied according to the usual method on the primer layer.

Saturated polyesters used for forming the topcoat include polyethylene terephthalate, polybutylene terephthalate and derivatives thereof. Acrylic ester resins used for the same purpose include (poly)methyl methacrylate, (poly)butyl methacrylate, (poly)isobutyl methacrylate, (poly)-2-ethylhexyl methacrylate, etc. Similarly, isocyanate resins include (poly)hexamethylene diisocyanate, (poly)isophorone diisocyanate, etc.

When the acrylic ester resin is contained in the reactive paint forming the topcoat layer, the surface of the thermoplastic elastomer surface layer becomes difficult to get scratches. If the isocyanate resin is incorporated into the topcoat layer, the thus incorporated topcoat layer comes to have excellent surface characteristics and, at the same time, the incorporated isocyanate resin reacts with the primer layer or the thermoplastic elastomer surface layer, whereby it becomes possible to make the topcoat layer to strongly adhere to the primer layer and the thermoplastic elastomer surface layer. Furthermore, if the saturated polyester is contained in the topcoat layer, a topcoat layer excellent in surface characteristics is obtained and, at the same time, integrity between the saturated polyester and the acrylic ester resin or the polyisocyanate resin can be maintained satisfactorily.

The topcoat layer used in the present invention preferably contains a combination of 95-5 parts by weight of a saturated polyester resin and 5-95 parts by weight of a polyisocyanate resin, a combination of 95-5 parts by weight of an acrylic ester resin and 5-95 parts by weight of a polyisocyanate resin, or a combination of 80-15 parts by weight of a saturated polyester resin, 15-85 parts by weight of an acrylic ester resin and 20-5 parts by weight of a polyisocyanate resin. Of these combinations mentioned above, preferred is a combination which contains all the saturated polyester resin, acrylic ester resin and polyisocyanate resin.

The topcoat forming coating solution may be incorporated, if necessary, with silicic acid anhydride (silica), pigments, delustering agents, etc.

Organic solvents used for dissolving the above-mentioned resins for use in the topcoat layer include methyl ethyl ketone, toluene, xylene, cyclohexane, methylene chloride, etc.

Of these solvents, particularly useful is a mixed solvent comprising toluene and methyl ethyl ketone. The solids contents in the coating solution for forming the topcoat is 5-50% by weight, preferably about 10-15% by weight.

A film thickness of the topcoat layer to be formed in the manner mentioned above on the primer layer surface is preferably 3-30 um, more preferably about 10-20 um.

To apply the primer layer forming coating solution and the topcoat layer coating solution respectively to the surface of the thermoplastic elastomer surface layer and that of the primer layer, there may be adopted the usual coating method using, for example, a gravure role coater, role coater, knife coater, screen coater, sprayer, etc.

Furthermore, the surface of the thermoplastic elastomer surface layer may be subjected, prior to forming the primer layer, to corona discharge treatment.

Surface characteristics of the thermoplastic elastomer surface layer can be markedly improved by forming the primer layer and topcoat layer on the surface of the surface layer. That is, the thermoplastic elastomer surface layer has excellent physical properties, but, on the other hand, it has such problems that because of its polyolefinic nature, it is poor in scratch tresistance of the surface and the surface thereof is apt to be attached by hydrocarbon solvents. However, by virtue of forming the above-mentioned primer (undercoat) and topcoat layers on the surface of the thermoplastic elastomer surface layer, the abrasion resistance, anti-scratching properties, etc. can be improved and, moreover, surface gloss and surface touch of can be maintained in the optimal state. Furthermore, the above-mentioned primer and topcoat layer have excellent adhesion to the thermoplastic elastomer surface layer and, at the same time, have excellent adaptability to thermal deformation treatment of the thermoplastic elastomer surface layer.

When the thermoplastic elastomer surface layer is coated with a reactive paint, the coating treatment may be carried out either before or after the preparation of the laminate. It is generally preferred to coat the thermoplastic elastomer surface layer prior to the lamination.

A base fabric (a), a polyolefin intermediate layer (b) and a thermoplastic elastomer layer (c), as described above, can be integrated to a laminate by any one of the following lamination techniques.

(1) Heat fusion method

A polyolefin intermediate layer (b) in the form of a film, which has been preformed by an inflation or T-die method, is sandwiched between a base fabric (a) and a thermoplastic elastomer surface layer (c), and the resulting assembly is heated under pressure. Alternatively, a polyolefin intermediate layer (b) is applied to a base fabric (a) by an extrusion coating method or to a thermoplastic elastomer surface layer (c) by a co-extrusion method, and the resultant laminate is put together with the remaining material under heat and pressure.

In this method a suitable processing temperature is about 20° C. above the melting point of the intermediate layer, normally ranging from about 100° C. to about 150° C., and particularly from about 125° C. to about 145° C., and a suitable processing pressure may be within the range between about 100 g/cm$^2$ and 1000 g/cm$^2$.

(2) Sandwich lamination method

Via a molten film of a polyolefin intermediate layer (b), a base fabric (a) and a thermoplastic elastomer surface layer (c) are put together. More particularly, as a polyolefin intermediate layer (b) is extruded through a T-die in the form of a molten film and passed through a nip of rolls, a base fabric (a) and a thermoplastic elastomer surface layer (c) are introduced to the same nip from both sides of the intermediate layer (b) being passed through to the nip, and the assembly is continuously rolled together to form a laminate. This method is particularly useful in a case where the intermediate and surface layers can not be co-extruded, for example, in a case wherein the surface layer has an embossed surface pattern.

(3) Hot melt method

A hot melt adhesive formulation, prepared from a polyolefin intermediate layer forming composition, and optionally containing a wax for viscosity adjustment and an adhesive for enhancing adhesion, is applied onto either one of a base fabric (a) and a thermoplastic elastomer surface layer (c) by means of a hot melt gun, followed by application of the remaining member under pressure.

In the thermoplastic elastomer laminate according to the invention, the thickness of the base fabric (a) is not particularly restricted. The polyolefin intermediate layer (b) may normally have a thickness of from about 20 to about 500 μm, and preferably from about 10 to about 300 μm, while the thickness of the thermoplastic surface layer (c) may be from about 100 μm to about 500 mm, and preferably from about 100 μm to about 1 mm.

The thermoplastic elastomer laminate according to the invention may be provided with a polyethylene film between the base fabric (a) and the polyolefin intermediate layer (b).

EFFECT OF THE INVENTION

The thermoplastic elastomer laminate according to the invention in which the base fabric (a) and the thermoplastic elastomer surface layer (c) are firmly bonded together by means of the specified polyolefin intermediate layer (b), has excellent properties in that it is not deteriorated or discolored upon exposure to sunlight; it is well resistant against hot and cold atmospheric temperatures; and it does not contain a large amount of a plasticizer, and, in consequence, does not suffer from problems that may be raised by the use of a large amount of a plasticizer.

The thermoplastic elastomer laminate according to the invention are useful as interior automotive sheets (for a door, ceiling, handle and seats), covers (outer skins) for chairs, sofas and other furniture, materials for cases, bags, covers of books, purses, and other like goods.

The invention will be illustrated by the following examples, but it should be construed that the invention is in no way limited to those examples.

REFERENCE EXAMPLE 1

Step (1)

Preparation of thermoplastic elastomer

Using the following components, a themoplastic elastomer was prepared in the manner as mentioned hereinafter.

(A component): Ethylene/propylene/ethylidene norbornene copolymer rubber; Ethylene unit/propylene unit (molar ratio): 78/22, Iodine value 15, Mooney viscosity (ML$_{1+4}$, 121° C.) 61

(B component): Isotactic polypropylene resin; Melt index 13 g/10 min (230° C.)

(C component): Butyl rubber (Degree of unsaturation 0.8)

(D component): Naphthene type process oil (E component): A mixture comprising 20% by weight of 1,3-bis(tert-butylperoxypropyl)benzene, 30% by weight of divinylbenzene and 50% by weight of paraffin type mineral oil.

In a Banbury mixer, a mixture comprising 55 parts by weight of (A component), 25 parts by weight of (B component), 20 parts by weight of (C component) and 35 parts by weight of (D component) was kneaded in a nitrogen atmosphere at 180° C. for 5 minutes, and the resulting kneaded product was formed with a sheet cutter into square pellets.

In a henschel mixer, a mixture comprising 100 parts by weight of the square pellets obtained above and 1 part by weight, based on the square pellets, of (E component) was kneaded, and the kneaded product obtained was extruded in a nitrogen atmosphere at 220° C. with an extruder to prepare a partically crosslinked thermoplastic elastomer.

Step (2)

Preparation of sheet

The thermoplastic elastomer thus prepared was extruded with a 90 mm T-die extrusion molding machine manufactured and sold by Toshiba under such conditions that a screw is a full-flighted screw, L/D is 22, an extrusion temperature is 220° C., T-die is a coat hanger die, and a haul-off speed is 5 m/min, and cooled with a chill roll to prepare a sheet. The product will be referred to herein as TPE-A with surface untreated.

Step (3)

Surface treatment step

On the surface of the sheet prepared above was coated one time a coating solution for forming a first primer layer comprising 10 parts by weight of chlorinated polypropylene, 2 parts by weight of silicic acid anhydride and 88 parts by weight of toluene with a gravure roll of 120 meshes, followed by drying at 70° C. for 20 seconds.

On the surface of the first primer layer thus formed was coated a coating solution for forming a second primer layer comprising 8 parts by weight of polyvinyl chloride, 2 parts by weight of a pigment and 90 parts by weight of methyl ethyl ketone with a gravure roll to print a cloud pattern thereon, followed by drying at 70° C. for 20 seconds.

On the surface of the second primer layer thus formed was then coated one time a coating solution for forming a topcoat layer comprising 5 parts by weight of polyvinyl chloride, 5 parts by weight of polyacrylic ester, 3 parts by weight of silicic acid anhydride and 87 parts by weight of methyl ethyl ketone with a gravure roll of 100 meshes. With a far infrared heater, the sheet thus formed was heated until the surface temperature rises up to 180° C. and the surface of the sheet was subjected to emboss treatment. The product will be referred to herein as TPE-A with surface treated.

REFERENCE EXAMPLE 2

Step (1)

Preparation of thermoplastic elastomer

Using the following components, a thermoplastic elastomer was prepared in the manner as mentioned hereinafter.
(A component): Ethylene/propylene/ethylidene norbornene copolymer rubber; Ethylene unit/propylene unit (molar ratio): 78/22, Iodine value 15, Mooney viscosity (ML$_{1+4}$, 121° C.) 61
(B component): Isotactic polypropylene resin; Melt index 13 g/10 min (230° C.)
(C component): Naphthene type process oil
(D component): A mixture comprising 20% by weight of 1,3-bis(tert-butylperoxypropyl)benzene, 30% by weight of divinylbenzene and 50% by weight of paraffin type mineral oil.

In a Banbury mixer, a mixture comprising 70 parts by weight of (A component), 30 parts by weight of (B component), and 20 parts by weight of (C component) was kneaded in a nitrogen atmosphere at 180° C. for 5 minutes, and the resulting kneaded product was formed with a sheet cutter into square pellets.

In a henschel mixer, a mixture comprising 100 parts by weight of the square pellets obtained above and 1 part by weight, of (D component) was kneaded, and the kneaded product obtained was extruded in a nitrogen atmosphere at 220° C. with an extruder to prepare a partically crosslinked thermoplastic elastomer.

Step (2)

Preparation of sheet

Using the thermoplastic elastomer prepared in Step (2) above, a sheet was prepared following the procedures described in Step (2) of Reference Example 1. The product will be referred herein as TPE-B with surface untroated.

Step (3)

Surface treatment step

TPE-B with surface untreated was surface treated as in Step (3) of Reference Example 1. The product will be referred herein as TPE-B with surface treated.

REFERENCE EXAMPLE 3

Preparation of polyolefin intermediate layer 5 parts by weight of high density polyethylene (Hyzex 1300J, supplied by Mitsui Petrochemical Industries Co., Ltd.) having 2% by weight of maleic anhydride grafted thereon and 95 parts by weight of low density polyethylene (Milason M-50, supplied by Mitsui Petrochemical Industries Co., Ltd.) were melt blonded in an extruder and extruded through a T-die with a resin temperature of 230° C. to prepare a sheet having a thickness of about 50 μm. The product will be referred herein as intermediate layer A.

REFERENCE EXAMPLE 4

Preparation of Polyolefin Intermediate Layer

An ethylene-1-butene copolymer (melt index of 8.6 g/10 min, ethylene content of 90 mole %, density of 0.89 g/cm$^3$, crystallinity of 17% by X-ray measurement and Vicat softening temperature of 60° C.) having 0.3% by weight of maleic anhydride grafted thereon, was extrude through a T-die to provide a sheet having a thickness of 50 μm. The product will be referred, herein as intermediate layer B.

EXAMPLES 1-3

The intermediate layer A (thickness of 50 μm) was sandwiched between a layer (thickness of 0.5 μm) of TPE-A with surface untreated and each base fabric (thickness of 0.3 mm) indicated in Table 1, and the resulting assembly was pressed at a temperature of 130° C. with an initial pressure of 250 g/cm$^2$ for 2 minutes to prepare a laminate. The products were tested for the tensile strength at break, elongation at break and interlayer adhesion strangh.

The tensile strength at break and elongation at break were determined in accordance with JIS 6772, using a tensile tester, on a sample having a width of 15 mm with both ends cramped, at a tensile rate of 300 mm/min. and a chart sped of 30 mm/min.

The interlayer adhesion strength (180° C. peeling strength between the surface and intermediate layers) was determined in accordance with JIS K 6772, on a sample having a width of 15 mm at a temperature condition of 23° C. and at a tensile rate of 300 mm/min.

The results are shown in Table 1.

EXAMPLES 4-6

Examples 1-3 were repeated except that the intermediate layer A was replaced with intermediate layer B. The products were tested as in Examples 1-3.

The results are shown in Table 2.

EXAMPLES 7-9

Examples 1-3 were repeated except that the TPE-A with surface treated was replaced with TPE-B with surface treated. The products were tested as in Examples 1-3.

The results are shown in Table 3.

EXAMPLES 10-12

Examples 7-9 were repeated except that the intermediate layer A was replaced with intermediated layer B. The products were tested as in Examples 1-3.

The results are shown in Table 4.

The products were further tested for the following surface charateristics in the manner as noted below. The results are shown in Table 5. formed on the surface of molded article of thermoplastic elastomer were evaluated in the following manner.

1. 1. Adhesion of coating

Two days after coating, 100 squares are formed on the surface of coating by cutting said surface with a sharp-edged razor to give 11 cuts in parallel line at intervals of 2 mm, and 11 cuts in parallel line at intervals of 2 mm crossing at right angles thereover, thereby forming 100 spares of 2 mm of the coating. An adhesive cellophane tape, a product of Nichiban Co., Ltd., is then applied to the whole surface of the 100 squares thus formed, and immediately thereafter the tape is vigorously peeled off therefrom to examine the number of squares peeled off. (The above test is hereinafter called the cross-scraping test for short.)

The results obtained in the test were represented in terms of values calculated on the basis of the following formula.

$$\frac{\text{Number of undetached squares out of 100 squares formed}}{100}$$

EXAMPLE

When no squares were detached at all . . . 100/100
When all the squares were detached . . . 0/100.

1. 2. Abrasion resistance test

Using a revolving vibrator type crockmeter as stipulated in 4. (1) of JIS L-0849, the surface of sheet is abraded 200 times under a continuous load of 500 g with Kanekin No. 3 as stipulated in an annexed table of JIS L-0803, and change in appearance of the surface of sheet thus abraded is evaluated according to the following ratings from A to E.

A. No change is observed at all in appearance of the surface tested.
B. Traces of the cotton fabric are left slightly on the surface tested.
C. The surface tested is injured.
D. The surface tested undergoes blushing.
E. Not only the surface tested but also the substrate thereof is destroyed.

1. 3. Crease-flex resistance test

Test sheet specimens, 3 cm × 12 cm, are taken out of the molded sheet in a uniform direction, either longitudinally or laterally, in accordance with 5.17 Frictional Force, C Method (Scott Shape Method) as stipulated in JIS L-1005, and each specimen is fixed between two slide fasteners placed at an interval of 2 cm. The specimen thus fixed is frictioned back and forth 1000 times for a distance of 4 cm under a pressure loading of 1 kg (or 500 gr).

RATINGS

A. No change is observed at all in appearance of the test specimen.
B. Blushing is observed slightly.
C. Blushing or peeling is observed.

1. 4. Anti-sticking test

The test is conducted in accordance with 9.7 Non-sticking Test as stipulated in JIS K-6772.

Two sheets of the test specimen, 90 mm × 60 mm, are put one upon another so that their surfaces face to face, placed between two sheets of smooth glass plate, 60 mm × 60 mm, and the resulting assembly on which a 2 kg weight is placed is allowed to stand for 24 hours in an air thermostat kept at 70° C.±2° C. The assembly is then taken out of the thermostat and the weight is removed therefrom, followed by allowing to cool for 1 hour at room temperature. The two test specimens thus treated are peeled off gently from each other to examine whether any change such as damage occurs or not on the surfaces of the test specimens thus peeled.

RATINGS

A. No change such as damage or sticking is observed.
B. Sticking is observed to some extent.
C. Damage is observed.

1. 5. Solvent resistance test

The surface of the test specimen is strongly wiped with flannel impregnated with industrial gasoline to examine whether change occurs or not on the wiped surface.

RATINGS

A. No change is observed at all.
B. Traces of cloudiness or the like are observed.
C. Damages caused by peeling or dissolving occur.

TABLE 1

| Example | Constitution of laminate | | | Tension strength at break (kg/15 mm) | Elongation at break (%) | Breakage performance | Interlayer adhesion strength (g/15 mm) | Touch |
|---|---|---|---|---|---|---|---|---|
| | layer | Material | | | | | | |
| Example 1 | Surface | TPE-A with surface treated | L.D. of fabric | 10.0 | 75 | Fabric and Surface Layer simultaneously broken | 870 | Good |
| | Intermediate | A | | | | | | |
| | Base | Rayon staple | T.D. of fabric | 5.6 | 180 | Fabric and Surface Layer simultaneously broken | | |
| Example 2 | Surface | TPE-A with | L.D. of fabric | 9.8 | 210 | | 900 | Good |

TABLE 1-continued

| Example | Constitution of laminate layer | Material | | Tension strength at break (kg/15 mm) | Elongation at break (%) | Breakage performance | Interlayer adhesion strength (g/15 mm) | Touch |
|---|---|---|---|---|---|---|---|---|
| | Inter-mediate | surface treated A | T.D. of fabric | Fabric 6.3 | Fabric 290 | Fabric broken and peeled, and then | | |
| | Base | Nyron tricot | | TPE 1.6 | TPE 620 | TPE broken | | |
| Example 3 | Surface | TPE-A with surface treated A | L.D. of fabric | 8.8 | 350 | Fabric and Surface Layer simultaneously broken | 740 | Good |
| | Inter-mediate | | T.D. of fabric | 4.8 | 610 | Fabric and Surface Layer simultaneously broken | | |
| | Base | Wooly nylon | | | | | | |

TABLE 2

| Example | Constitution of laminate layer | Material | | Tension strength at break (kg/15 mm) | Elongation at break (%) | Breakage performance | Interlayer adhesion strength (g/15 mm) | Touch |
|---|---|---|---|---|---|---|---|---|
| Example 4 | Surface | TPE-A with surface treated B | L.D. of fabric | 8.7 | 85 | Fabric and Surface Layer simultaneously broken | 800 | Good |
| | Inter-mediate | | T.D. of fabric | 5.3 | 260 | | | |
| | Base | Rayon staple | | | | | | |
| Example 5 | Surface | TPE-A with surface treated B | L.D. of fabric | 10.6 | 190 | Fabric and Surface Layer simultaneously broken | 810 | Good |
| | Inter-mediate | | T.D. of fabric | 6.9 | 310 | | | |
| | Base | Nyron tricot | | | | | | |
| Example 6 | Surface | TPE-A with surface treated B | L.D. of fabric | 7.5 | 300 | Fabric and Surface Layer simultaneously broken | 780 | Good |
| | Inter-mediate | | T.D. of fabric | 4.5 | 540 | | | |
| | Base | Wooly nylon | | | | | | |

TABLE 3

| Example | Constitution of laminate layer | Material | | Tension strength at break (kg/15 mm) | Elongation at break (%) | Breakage performance | Interlayer adhesion strength (g/15 mm) | Touch |
|---|---|---|---|---|---|---|---|---|
| Example 7 | Surface | TPE-A with surface treated A | L.D. of fabric | 11.5 | 80 | Fabric and Surface Layer simultaneously broken | 850 | Good |
| | Inter-mediate | | T.D. of fabric | 7.4 | 200 | Fabric and Surface Layer simultaneously broken | | |
| | Base | Rayon staple | | | | | | |
| Example 8 | Surface | TPE-B with surface treated A | L.D. of fabric | 12.0 | 220 | Fabric and Surface Layer simultaneously broken | 810 | Good |
| | Inter-mediate | | T.D. of fabric | Fabric 7.5 | Fabric 300 | Fabric broken and peeled, and then | | |
| | Base | Nyron tricot | | TPE 2.1 | TPE 650 | TPE broken | | |
| Example 9 | Surface | TPE-B with surface treated A | L.D. of fabric | 9.5 | 360 | Fabric and Surface Layer simultaneously broken | 780 | Good |
| | Inter-mediate | | T.D. of fabric | 5.5 | 620 | Fabric and Surface Layer simultaneously broken | | |
| | Base | Wooly nylon | | | | | | |

TABLE 4

| Example | Constitution of laminate layer | Material | | Tension strength at break (kg/15 mm) | Elongation at break (%) | Breakage performance | Interlayer adhesion strength (g/15 mm) | Touch |
|---|---|---|---|---|---|---|---|---|
| Example 10 | Surface | TPE-B with surface treated B | L.D. of fabric | 9.5 | 90 | Fabric and Surface Layer simultaneously broken | 820 | Good |
| | Inter-mediate | | T.D. of fabric | 6.8 | 270 | | | |
| | Base | Rayon staple | | | | | | |
| Example 11 | Surface | TPE-B with surface treated B | L.D. of fabric | 13.5 | 210 | Fabric and Surface Layer simultaneously broken | 890 | Good |
| | Inter- | | | | | | | |

TABLE 4-continued

| Example | Constitution of laminate layer | Material | | Tension strength at break (kg/15 mm) | Elongation at break (%) | Breakage performance | Interlayer adhesion strength (g/15 mm) | Touch |
|---|---|---|---|---|---|---|---|---|
| | mediate Base | Nyron tricot | T.D. of fabric | 7.5 | 330 | | | |
| Example 12 | Surface | TPE-B with surface treated B | L.D. of fabric | 8.8 | 350 | Fabric and Surface Layer simultaneously broken | 810 | Good |
| | Intermediate Base | Wooly nylon | T.D. of fabric | 6.7 | 580 | | | |

TABLE 5

| | Examples 1-6 | Examples 7-12 |
|---|---|---|
| Adhesion of coating cross-scraping test | 100/100 | 100/100 |
| Abrasion resistance test | A | A |
| Cross-flex resistance test | A | A |
| Anti-sticking test | A | A |
| Solvent resistance test | B | B |

What is claimed is:

1. A thermoplastic elastomer laminate comprising:
(a) a base fabric,
(b) a polyolefin intermediate layer formed on said fabric comprising a polyolefin, which has graft polymerized portions modified by grafting with at least one monomer selected from unsaturated carboxylic acids and derivatives thereof in an amount of from about $10^{-4}$ to 4% by weight, and
(c) a thermoplastic elastomer surface layer formed on said intermediate layer, which is composed of a composition comprising:
(A) a polyolefin resin and
(B) an ethylene/alpha-olefin copolymer rubber, in which only said copolymer rubber is, or both said copolymer rubber and at least a part of said polyolefin resin are partially crosslinked.

2. A thermoplastic elastomer laminate comprising:
(a) a base fabric,
(b) a polyolefin intermediate layer formed on said fabric comprising a polyolefin, which has graft polymerized portions modified by grafting with at least one monomer selected from unsaturated carboxylic acids and derivatives thereof in an amount of from about $10^{-4}$ to 4% by weight, and
(c) a thermoplastic elastomer surface layer formed on said intermediate layer, which is composed of a composition comprising:
(A) a polyolefin resin and
(B) an ethylene/alpha-olefin copolymer rubber, in which only said copolymer rubber is, or both said copolymer rubber and at least a part of said polyolefin resin are partially crosslinked,
said laminate further comprising a painted film layer on said surface layer made from a reactive paint containing at least one compound selected from saturated polyester resins, acrylate resins and isocyanate resins.

3. A thermoplastic elastomer laminate comprising:
(a) a base fabric,
(b) a polyolefin intermediate layer formed on said fabric comprising a polyolefin, which has graft polymerized portions modified by grafting with at least one monomer selected from unsaturated carboxylic acids and derivatives thereof in an amount of from about $10^{-4}$ to 4% by weight, and
(c) a thermoplastic elastomer surface layer formed on said intermediate layer, which is composed of a composition comprising:
(A) a polyolefin resin and
(B) an ethylene/alpha-olefin copolymer rubber, in which only said copolymer rubber is, or both said copolymer rubber and at least a part of said polyolefin resin are partially crosslinked,
said laminate further comprising a primer layer on said surface layer comprising at least one polymeric compound selected from saturated polyesters and chlorinated polyolefins, and a topcoat layer formed on said primer layer made from a reactive paint containing at least one compound selected from saturated polyester resins, acrylate resins and isocyanate resins, with a proviso that when said primer layer consists essentially of at least one polymeric compound selected from saturated polyester resins, said topcoat layer is made from a reactive paint containing at least one compound selected from acrylate resins.

* * * * *